Nov. 16, 1943.  R. S. BOHANNAN  2,334,242
HYDRAULIC WEIGHING SCALE WITH TEMPERATURE COMPENSATING MEANS
Filed May 12, 1941    3 Sheets-Sheet 1
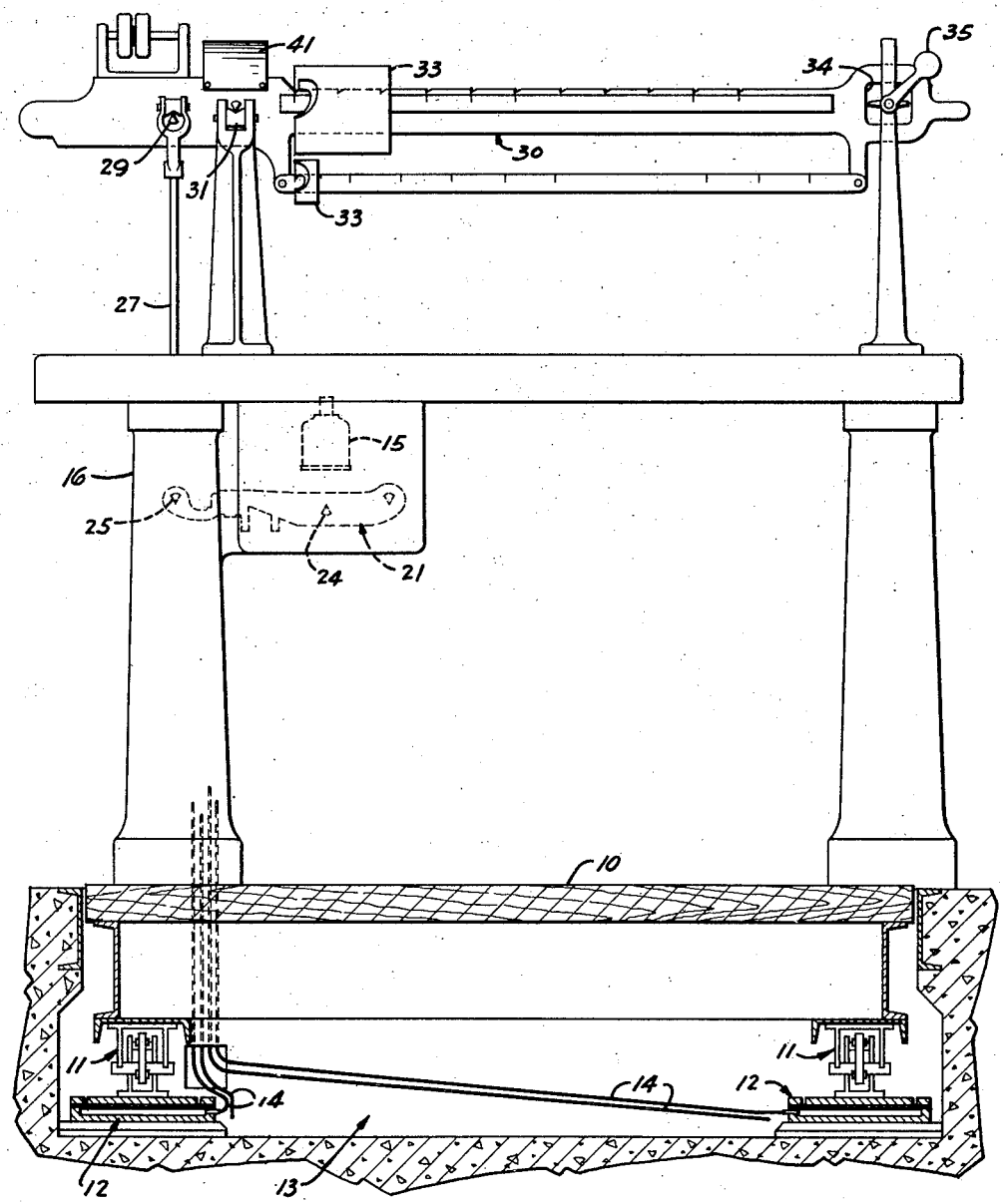
Fig. I
Robert S. Bohannan
INVENTOR
BY Marshall & Marshall
ATTORNEYS

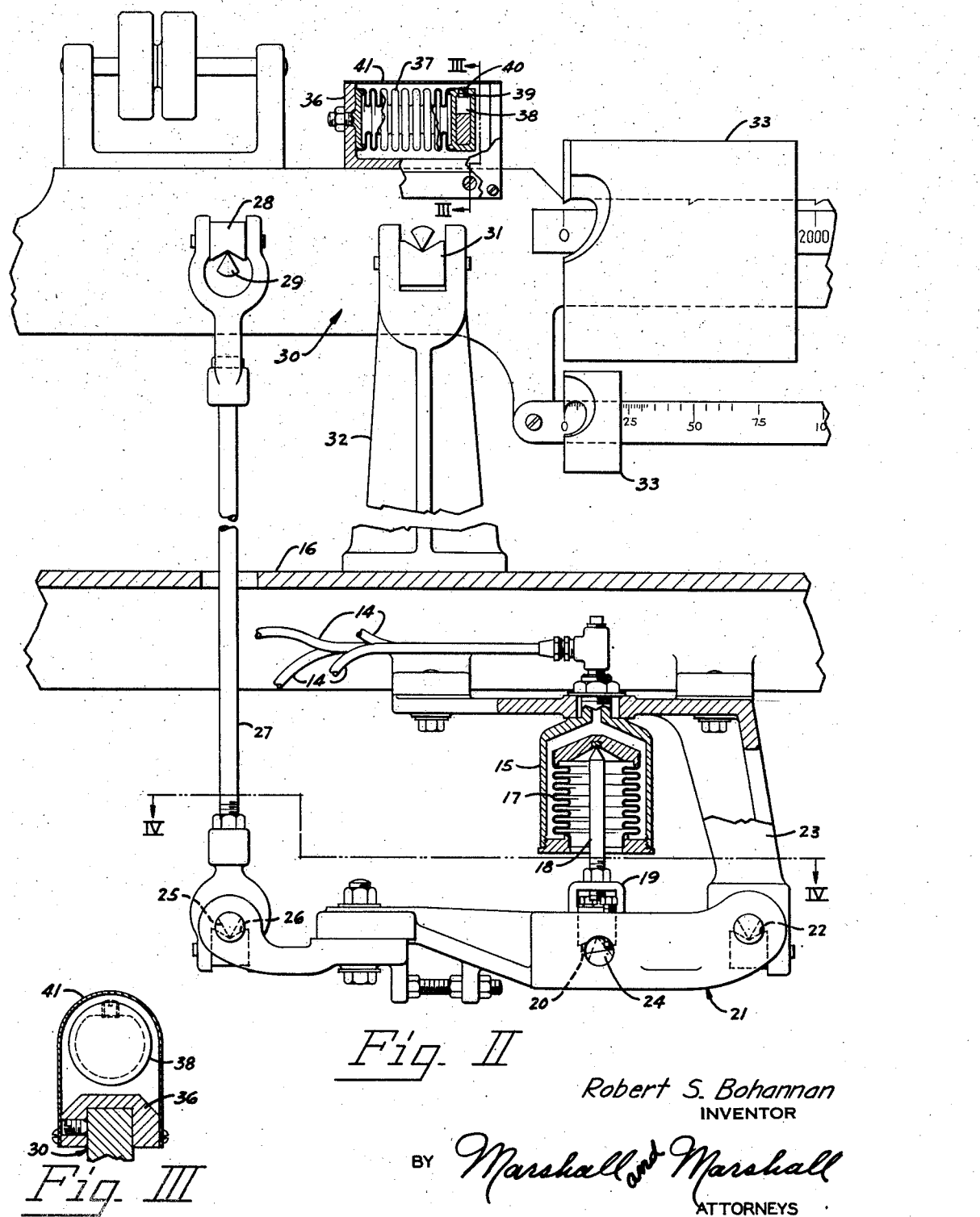

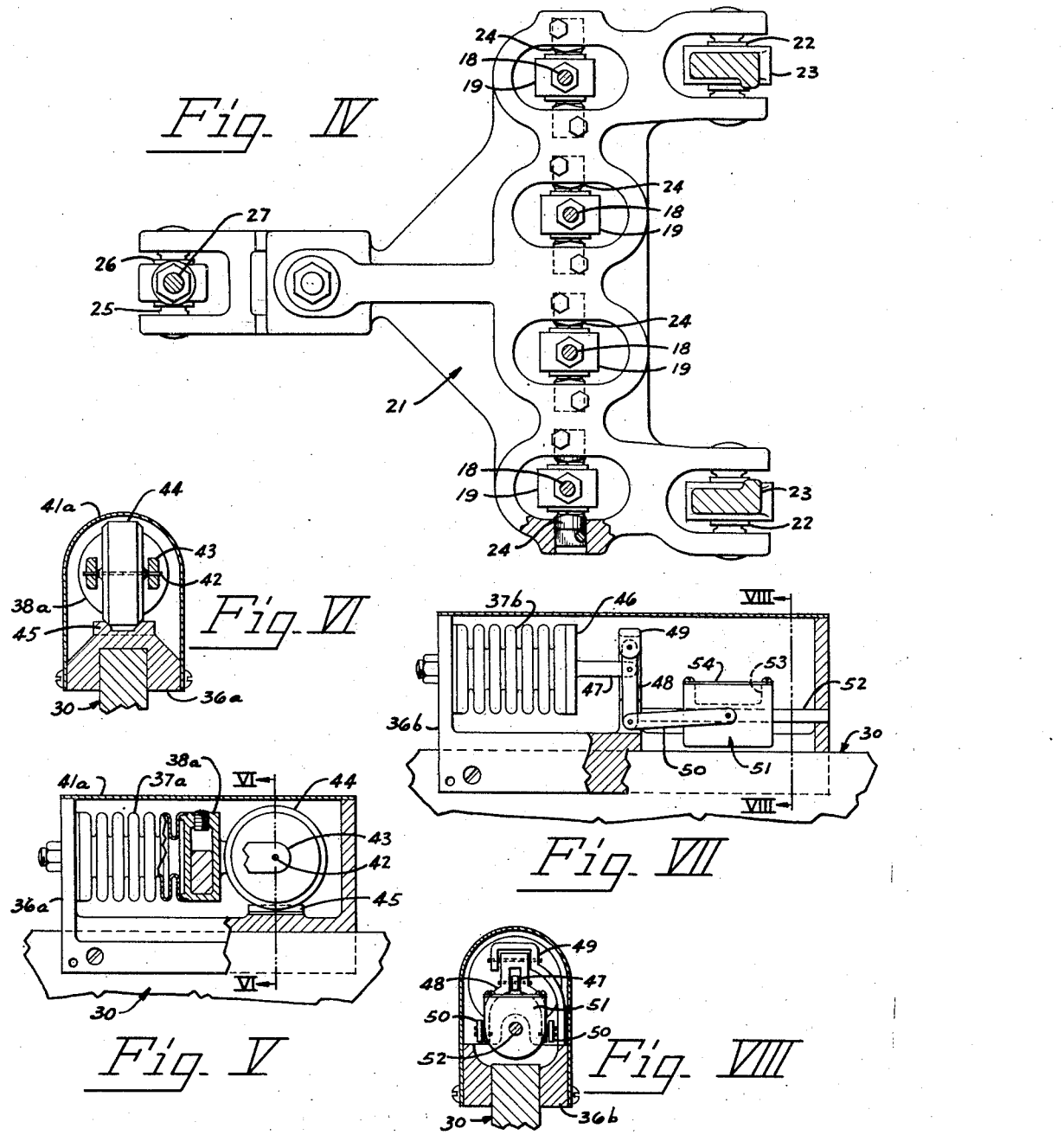

Patented Nov. 16, 1943

2,334,242

UNITED STATES PATENT OFFICE 2,334,242

HYDRAULIC WEIGHING SCALE WITH TEMPERATURE COMPENSATING MEANS

Robert S. Bohannan, Toledo, Ohio, assignor to Toledo Scale Company, Toledo, Ohio, a corporation of New Jersey Application May 12, 1941, Serial No. 393,012

9 Claims. (Cl. 265—47)

This invention relates to weighing scales of the type wherein the force transmission mechanism includes a hydraulic system, and more particularly to means for automatically compensating for the effect of temperature changes on the hydraulic liquid contained in the hydraulic system.

A heavy duty weighing scale may be so placed that the platform, or load receiving portion of the scale, is in the open where it is exposed to temperature changes of many degrees during relatively short periods of time. When a heavy duty scale of the hydraulic type is exposed to such temperature changes, expansion and contraction of the liquid in the hydraulic system of the scale takes place. Expansion of the liquid results in application of a greater force to the load counterbalance, and the application to the load counterbalancing portion of the scale of the additional force created by expansion of the liquid must be counteracted by increased counterforce to bring the scale to balance. If such increased counterforce is applied by a weighing poise, the amount of the load being weighed is indicated erroneously.

It is an object of this invention to provide an automatic means whereby a force or pressure is applied to the load counterbalancing mechanism in a direction opposite to, and in an amount proportional to the increased force or pressure which is the result of the expansion of the liquid in the hydraulic system of the scale.

More specific objects and advantages are apparent from the description, in which reference is had to the accompanying drawings illustrating a preferred form of scale embodying the invention.

In the drawings:

Fig. I is a front elevation of a scale embodying the invention.

Fig. II is an enlarged fragmentary front elevation of members connecting the hydraulic system to the load counterbalancing means, certain portions being shown in section.

Fig. III is a vertical section taken on the line III—III of Fig. II.

Fig. IV is a horizontal section taken on the line IV—IV of Fig. II, and illustrating the shelf lever of the scale.

Fig. V is a front elevation of an alternate form of the invention, certain parts being shown in section.

Fig. VI is a section taken on the line VI—VI of Fig. V.

Fig. VII is a front elevation of another alternate form of the invention.

Fig. VIII is a vertical section taken on the line VIII—VIII of Fig. VII.

These specific drawings and the specific description that follows merely disclose and illustrate the invention and are not intended to impose limitations upon the claims.

The specific details of the operation of the load receiving and force transmitting portions of a hydraulic scale are disclosed in my copending applications Serial Nos. 222,831–299,832 and 299,833.

A platform 10 is supported upon parallel link suspension devices 11, which are in turn supported upon the upper plates of capsules 12 located in a scale pit 13. Leading from the capsules 12 are pipe lines 14, each one of which is connected to an individual chamber 15 (Fig. II) mounted on a shelf of a stand 16. Each of the capsules 12 has a corresponding pipe line 14 and chamber 15, thus forming an individual self-enclosed hydraulic system. Mounted inside of each of the chambers 15 is a metallic bellows 17 through the open lower end of which extends a strut 18. Each of the struts 18 has adjustably attached to its lower end a clevis 19 in which is mounted a bearing 20.

A shelf lever 21 is fulcrumed on a bearing 22 mounted in a bracket 23 which is attached to the stand 16. The shelf lever 21 (Fig. IV) has mounted for rockable adjustment therein a series of pivots 24 which carry the bearings 20 of the struts 18. A nose pivot 25, mounted in the shelf lever 21, engages a bearing 26 in the lower end of a vertically disposed pull rod 27, which passes through an opening in the stand 16. The upper end of the pull rod 27 carries a bearing 28, which rests upon a load pivot 29 mounted in a counterbalancing beam 30. The beam 30 is fulcrumed upon a bearing 31, carried by a fulcrum stand 32 mounted on the stand 16. The beam 30 (Fig. I) has slidably mounted thereon poises 33, which are moved along the beam 30 away from the fulcrum point to counterbalance the load. The end of the beam 30, opposite to the load pivot 29, has the usual trig loop 34 and locking lever 35.

A load placed upon the platform 10 exerts pressure downwardly upon the upper plates of the capsules 12, creating pressure in the pipes 14 and chambers 15, which compresses the bellows 17 exerting force downwardly on the shelf lever 21, the force being transmitted to the load pivot 29 of the beam 30 and counterbalanced by the poises 33.

Expansion of the liquid contained in the capsules 12, pipes 14 and chambers 15, due to a rise in temperature, exerts force on the bellows 17 in addition to that exerted as the result of a load and consequently the poises 33 must be extended further on the beam 30 to counterbalance the combined load and expansion created pressure. This, of course, results in an error in the reading of the scale.

A drop in temperature, and the resulting contraction of the liquid contained in the capsules 12, pipes 14 and chambers 15, produces an opposite result.

To compensate for this error, due to expansion of the hydraulic liquid, there is mounted on the beam 30 (Fig. II) a bracket 36 having fastened thereto a horizontally disposed bellows 37 which is filled with a liquid.

Attached to the end of the bellows, opposite that which is bolted to the bracket 36, is a weight chamber 38 adapted to be "sealed out" by means of the addition of lead or other heavy material added through a hole 39 which is closed with a plug 40. A dust cover 41 is mounted over the bellows 37 and weight chamber 38 to keep the parts clean.

The linear displacement of the end of the bellows 37 is in direct ratio to the volume change of the liquid in the hydraulic system of the scale. Thus, a weight attached to the free end of the bellows will be moved in a direct ratio to such expansion and will exert an increased force on the beam 30 in proportion to such expansion. Since the amount of weight in the weight chamber 38 can be varied and "sealed out" its movement compensates exactly for the variation of force applied to the beam due to volume changes of the liquid in the hydraulic system of the scale and eliminates the necessity of moving the poises 33 further on the beam 30 than is necessary to balance the exact amount of the load.

A modification of the compensating means is shown in Figures V and VI wherein a bellows 37a is mounted on a bracket 36a and has a weight chamber 38a attached to its opposite end. Rotatably mounted on a pin 42, carried by two arms 43 attached to the weight chamber 38a, is a roller 44 which rolls in a way 45. The purpose of this roller 44 is to support the end of the bellows 37a, carrying the weight chamber 38a, and prevent it from sagging as the weight is extended. A dust cover 41a extends over the mechanism to protect it.

A second modification of the invention is shown in Figures VII and VIII. A bellows 37b is mounted on a bracket 36b and has a plate 46 at its closed end. A horizontal arm 47, centrally attached to the plate 46, is pivotally connected to a fork 48 which is pivotally supported in a vertically disposed bracket 49 attached to the main bracket 36b. Pivotally connected to the lower end of the legs of the fork 48 are horizontally disposed links 50 which are connected to an adjustable weight 51 slidably carried on a rod 52 horizontally mounted in portions of the bracket 36b. The weight 51 has a pocket 53 adapted to receive lead, or other heavy material, for "sealing out" and a cover plate 53 over the pocket 52. Since the arm 47 is connected to the fork 48, near its connection to the bracekt 49, and the links 50 are beyond this connection point, the fork 48 acts as an amplifying lever and the movement of the weight 51 is greater than that of the plate 46 attached to the bellows 37b. Because of this amplification of movement, the weight 51 exerts a large force on the beam 30 thus permitting a lesser weight to be used which can be more easily "sealed out."

The embodiments of the invention that have been disclosed may be modified to meet various requirements.

Having described the invention, I claim:

1. In a weighing scale, in combination, a load receiver, a load counterbalancing device, a hydraulic system for transmitting force from said load receiver to said load counterbalancing device, said system containing a liquid transmission medium which is subject to expansion and contraction with variations in temperature, a hollow expansible body confining a quantity of a thermostatically expansible and contractible liquid, and means having a variable moment of force actuated by said hollow expansible body in response to volumetric changes in the liquid confined therein for applying a force on said load counterbalancing device to compensate for effects of the expansion and contraction of the liquid in said hydraulic system.

2. In a weighing scale, in combination, a load receiver, a load counterbalancing device, a hydraulic system for transmitting force from said load receiver to said load counterbalancing device, said system containing a liquid transmission means, a hollow expansible body operatively connected to said load counterbalancing device and confining a quantity of a liquid and means actuated by said hollow expansible body for applying variable and precalculated force to said load counterbalancing device in a direction opposite to forces applied to said load counterbalancing device by changes in volume of the liquid in said hydraulic system.

3. In a weighing scale, in combination, a load receiver, a hydraulic system containing a liquid transmission medium and actuated by said load receiver, a load counterbalancing device actuated by said hydraulic system in proportion to the movement of said load receiver, a hollow expansible body, confining a quantity of a liquid, mounted on said load counterbalancing device, and a variable weight acting on said load counterbalancing device and moved by said hollow expansible body in proportion to the expansion of the liquid in said hydraulic system.

4. In a weighing scale, in combination, a load receiver, a hydraulic force transmission system containing a liquid, pressure creating means acting on said hydraulic force transmission system and actuated by said load receiver, a load counterbalancing device actuated by the pressure in said hydraulic system in proportion to the load on said load receiver and a metallic bellows mounted at one end on said load counterbalancing device and containing a quantity of liquid, said bellows having a variable weight attached to its free end which weight applies a force on said load counterbalancing device to compensate for the force applied on said load counterbalancing mechanism by expansion and contraction of the liquid in said hydraulic system.

5. In a device of the class described, in combination, a load receiver, a load counterbalancing device, a hydraulic system containing a liquid force transmission means for transmitting force from said load receiver to said load counterbalancing device and temperature compensating means comprising a hollow expansible member confining a quantity of a liquid and operatively connected to said load counterbalancing device, and a variable weight connected to said member and adapted, in response to temperature caused volumetric changes in the liquid confined therein, to apply force to said load counterbalancing device in inverse proportion to the force applied thereto by volumetric changes in the liquid in said hydraulic system caused by changes in temperature.

6. In a weighing scale, in combination, a load receiver, a load counterbalancing device, a hydraulic system for transmitting force from said load receiver to said load counterbalancing device, said system containing a thermostatically expansible and contractible liquid transmission means, a hollow expansible body confining a quantity of a thermostatically expansible and contractible liquid, one end of said hollow expansible body being connected to said load counterbalancing device, and a variable weight attached to the free end of said hollow expansible body for applying force to said load counterbalancing device in proportion to the volumetric changes in the liquid confined in said body in a direction opposite to forces applied to said load counterbalancing device by volumetric changes of the liquid transmission means contained in said hydraulic system.

7. In a weighing scale, in combination, a load receiver, a load counterbalancing beam, a hydraulic system for transmitting force from said load receiver to said beam, a hollow expansible body confining a quantity of a thermostatically expansible and contractible liquid and being mounted on and attached at one end to said beam, and a variable weight attached to the other end of said hollow expansible body, said hollow expansible body extending parallelly to the longitudinal axis of said beam.

8. In a device of the class described, in combination, a load receiver, a hydraulic system actuated thereby, a load counterbalancing device responsive to the pressure in said hydraulic system, a metallic bellows confining a quantity of liquid mounted at one end on said load counterbalancing device, a variable weight attached to the free end of said bellows, and a supporting roller attached to said weight to prevent a distortion of said bellows upon its extension due to the expansion of the liquid confined therein.

9. In a device of the class described, in combination, a load receiver, a load counterbalancing device, a hydraulic system containing a liquid for transmitting force from said load receiver to said load counterbalancing device, a metallic bellows confining a quantity of a liquid and mounted on said load counterbalancing device, an amplifying lever attached to said bellows for amplifying the longitudinal movement of said bellows due to the expansion of the liquid confined therein and a variable weight attached to said amplifying lever for applying a proportionately increased force to said load counterbalancing device to compensate for an oppositely applied pressure due to a change in volume of the liquid in said hydraulic system.

ROBERT S. BOHANNAN.